Oct. 3, 1933.    S. K. ATKINSON    1,929,300

EXPLOSIVE FERTILIZER CARTRIDGE

Filed April 19, 1932

Sheridan K. Atkinson, INVENTOR

BY Victor J. Evans & Co. ATTORNEY

WITNESS:

Patented Oct. 3, 1933

1,929,300

UNITED STATES PATENT OFFICE 1,929,300

EXPLOSIVE FERTILIZER-CARTRIDGE

Sheridan K. Atkinson, Boise, Idaho

Application April 19, 1932. Serial No. 606,259

1 Claim. (Cl. 47—1)

It is generally conceded that the present method or process of fertilizing trees, vines, shrubbery, plants and especially orchards, is not satisfactory. In some instances the fertilizer is merely scattered along the ground and thereafter ploughed with the earth into the ground surface, that is, the portion of the soil nearest the surface so that the fertilizer does not sink into the ground the desired depth which causes the plant roots to turn up instead of down in their search for food and water which often results in damage to the roots during the cultivation and during periods of drought. This is particularly true in the irrigated sections of the west and results in damage to the plants and financial loss to the grower.

The purpose of my invention is to overcome this unsatisfactory manner of fertilizing plants or trees by placing the plant food in or below the root zone of the trees, thus leading the roots down and fertilizing them and also creating a deeper and more permanent reservoir for moisture in the soil with the result that the plant will flourish in a better manner than when the fertilizer is applied as usual, so that the plants will bear fruit in greater abundance and of a better quality than is usual.

In carrying out my invention it is my purpose to drill holes with an ordinary earth auger or the like, such holes being drilled into the soil and into the root zone or below such root zones of trees, shrubs, vines or other plants and to insert a shell, cartridge or other container in this hole, the said shell or cartridge being filled with a good concentrated fertilizer which contains the necessary elements of plant food and the said shell or cartridge also containing therein an explosive substance which is detonated from a safe distance to burst the cartridge and to drive the fertilizer out into the surrounding soil, to loosen the soil and to place the plant food where it will lead to the roots of the plant and cause the said roots to travel downwardly toward the plant food in their search for food and to likewise loosen the soil so that the tree or shrub can have its roots readily penetrate such loosened soil and which also renders it possible for moisture to enter the subsoil in such irrigated regions.

To the attainment of the foregoing the invention consists in the improvement hereinafter described and definitely claimed.

Figure 1:
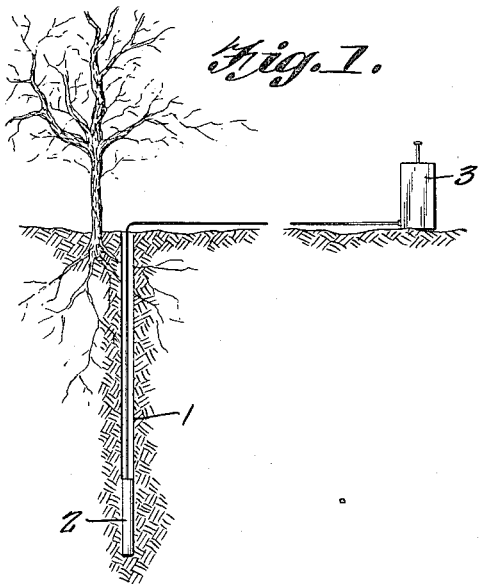
Figure 1 is a sectional view to illustrate the manner in which the improvement is utilized.

As disclosed by Figure 1 of the drawing I bore holes 1 in an orchard or nursery between trees or growing plants and the said hole is bored beneath the roots of the plants. In each of these holes I insert a cartridge 2 designed to be electrically exploded, the wires from the blasting caps in the cartridges being directed through the hole 1 and over the ground surface to the switches of the ordinary battery or explosive box 3, the switches being forced together by the usual handle.

Figure 2:
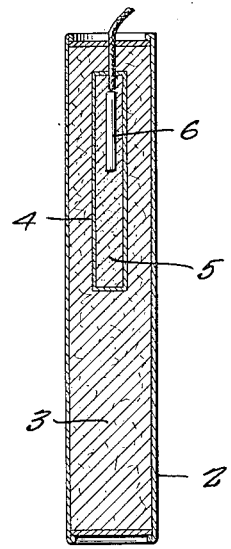
Figure 2 is a central longitudinal sectional view through one of the cartridges which I employ.

The cartridge 2 may be of any desired material, such as paper or the like. In the showing of Figure 2 the cartridge is filled with a fertilizer 3 that is in the nature of a highly concentrated plant food. In the said showing there is embedded in the cartridge and in the fertilizer 3 a shell 4 containing a high explosive 5 such as dynamite, nitroglycerine, TNT, black powder, etc., and in the shell there is a blasting cap 6 from which the wires lead.

Figure 3:
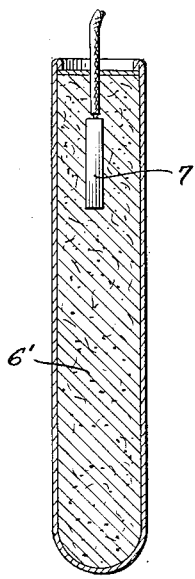
Figures 3 and 4 are similar sectional views through other cartridges.

In the showing of Figure 3 the cartridge is entirely filled with a mixed fertilizer of the type above mentioned and an explosive of the type also above mentioned. This mixture is indicated by the numeral 6' and in the mixture there is embedded a blasting cap 7 whose wire is directed through the top of the cartridge.

Figure 4:
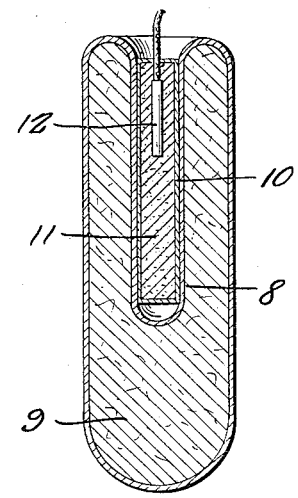

In Figure 4 the body of the cartridge has its top integrally formed with an inwardly extending neck portion 8 whose lower wall is rounded. The cartridge in the said Figure 4 is filled with a fertilizer 9 and in the cell 8 there is arranged a shell 10 affording a container for a high explosive 11 and which shell has embedded in the explosive 11 a blasting cap 12 from which is directed the conducting wire.

Any one of the above cartridges may rest on the bottom wall provided by the hole 1 and an electric circuit is directed to the blasting cap to explode the shell (in Figures 2 and 4) or the combined fertilizer and explosive as disclosed in Figure 3. The exploded cartridge will blast the ground below or in the root zone for the trees or plants, thereby creating cavities below such roots or root zone and which cavities are coated with the plant food which will attract the roots thereto ward and loosen the soil to insure the free passage of the roots therebetween, providing a hold for the reception of water or moisture, and directing such moisture through the soil to cause the roots of the plants to more readily travel through the soil in a downward direction.

As previously stated any class of high explosive may be employed. The fertilizer or plant food may be composed of a mixture of plant food elements or a single plant food substance. The plant food elements may be either mixed with the explosive or held separated therefrom in the cartridge and the explosion of the cartridge, blasting or creating a rapid combustion in the cylinder not only produces an excavation in the soil but a rapid spreading, disseminating or distribution of the plant food elements in the soil in close proximity to the roots of the trees or plants.

It is believed that when the foregoing description has been carefully read in connection with the accompanying drawing the advantages of my improved method and means for applying a fertilizer or plant food in the ground beneath the roots of growing plants will be understood and appreciated by those skilled in the art so that further detailed description will not be required. It is, however, thought well to state that it is in the province of this invention to punch or drill a hole in the soil and pour some fertilizer into this hole and then insert an explosive with cap and fuse or conductor wire and then place more fertilizer on top of the explosive and tamp it with earth or other substance and then explode it. In this instance, I will not employ a cartridge. Also it should be stated that the plant food is not necessarily arranged in the soil beneath or directly below the plant roots, but may be in the root zone of the plant or in close proximity to the roots of the trees or plants.

The discharged explosive, it is to be understood not only scatters the fertilizer around the walls of the chamber caused by the explosive but it actually drives the fertilizer into numerous cracks and crevices that are opened up by the explosion.

Having described the invention, I claim:

A device for distributing fertilizer comprising a bendable tubular paper casing having each end rounded and closed, said casing adapted to be partially filled with fertilizer and having its unfilled portion turned inwardly and embedded in the fertilizer to form an open end chamber lying within the fertilizer to receive an explosive.

SHERIDAN K. ATKINSON.